United States Patent [19]

Carlson

[11] Patent Number: 4,684,818

[45] Date of Patent: Aug. 4, 1987

[54] MOTOR VEHICLE ELECTRICAL SYSTEM PROVIDING MULTIPLE DC VOLTAGES

[75] Inventor: Richard A. Carlson, Pontiac, Mich.

[73] Assignee: General Motors Corporation, Detroit, Mich.

[21] Appl. No.: 891,637

[22] Filed: Aug. 1, 1986

[51] Int. Cl.[4] ............................................. H02P 9/26
[52] U.S. Cl. .................................... 307/10 R; 307/84; 322/90; 363/126; 320/48
[58] Field of Search ................. 307/10 R, 10 BP, 4, 307/8, 75, 76, 78, 82, 84, 15, 16, 18, 28, 68; 290/11, 12, 14, 15, 20, 23; 322/28, 77, 79, 89, 90, 99, 25, 35; 323/267; 363/125, 126; 320/32, 39, 40, 46, 48, 57, 58, 59, 61, 64, 65, 66, 67, 68

[56] References Cited

U.S. PATENT DOCUMENTS

| | | | |
|---|---|---|---|
| 3,202,901 | 8/1965 | Peras | 320/48 |
| 3,316,416 | 4/1967 | Carlson | 307/17 |
| 3,469,072 | 9/1969 | Carlson | 219/202 |
| 3,694,731 | 9/1972 | Cherry | 307/82 X |
| 3,770,976 | 11/1973 | Stroud et al. | 307/10 R |
| 3,771,045 | 11/1973 | Storz | 363/129 X |
| 3,912,108 | 10/1975 | Clayton et al. | 320/32 X |
| 3,916,284 | 10/1975 | Hilgendorf | 322/77 X |
| 3,921,053 | 11/1975 | Hekimian | 363/126 X |
| 3,932,765 | 1/1976 | Townsend | 363/126 X |
| 4,058,759 | 11/1977 | Halfhill | 322/90 X |
| 4,096,395 | 6/1978 | Bogel et al. | 307/66 X |
| 4,415,848 | 11/1983 | Morishita | 322/89 X |
| 4,454,464 | 6/1984 | Stroud | 307/84 X |
| 4,471,423 | 9/1984 | Hase | 363/126 X |
| 4,491,779 | 1/1985 | Campbell et al. | 322/90 X |
| 4,539,515 | 9/1985 | Morishita et al. | 307/84 X |
| 4,554,501 | 11/1985 | Baker | 307/16 X |
| 4,564,799 | 1/1986 | Iwaki et al. | 307/84 X |
| 4,618,811 | 10/1986 | Mashino et al. | 320/64 X |

Primary Examiner—William M. Shoop, Jr.
Assistant Examiner—Shik Luen Paul Ip
Attorney, Agent, or Firm—Tim G. Jaeger

[57] ABSTRACT

An electrical system for a motor vehicle includes a three-phase AC generator having wye-connected output windings and a three-phase full-wave rectifier. The neutral node of the wye-connected generator is grounded while the rectifier is ungrounded. As a result, three distinct DC voltages are produced: two three-phase half-wave rectified DC voltages of opposite polarity in respect to ground and a three-phase full-wave rectified voltage which is the sum of the other two DC voltages. One of the former lower-magnitude DC voltages may be employed to supply the usual low DC voltage loads of the vehicle while latter higher-magnitude DC voltage may be employed to energize a higher DC voltage load such as a window glass heater element.

2 Claims, 1 Drawing Figure

MOTOR VEHICLE ELECTRICAL SYSTEM PROVIDING MULTIPLE DC VOLTAGES

This invention relates to an electrical system for an automotive vehicle. More particularly, the invention relates to a vehicle electrical system including a motor driven three-phase generator for producing a three-phase AC voltage and a three-phase full-wave rectifier for converting the AC voltage to multiple DC voltages.

According to the invention, the three-phase output windings of the motor driven generator are connected in a wye configuration having a neutral node which is connected to system ground. Because of this ground connection, the amplitude of the three-phase AC voltage produced by the generator alternately swings positively and negatively in respect to ground. Further, pursuant to the invention, the three-phase full-wave rectifier is ungrounded.

As a result of the above structural arrangement, three distinct DC voltages are provided within the inventive vehicle electrical system. First, a three-phase half-wave rectified DC voltage of positive polarity is developed between one output terminal of the rectifier and ground. Second, a three-phase half-wave rectified DC voltage of negative polarity is developed between the other output terminal of the rectifier and ground. Third, a three-phase full-wave rectified DC voltage is developed between the two output terminals of the rectifier. This third DC voltage is equal to the sum of the other two DC voltages.

As contemplated by the invention, one of the half-wave rectified DC voltages (preferably the positive polarity voltage) may be regulated by a suitable voltage regulator and employed to supply power for charging the vehicle storage battery and energizing the various conventional low DC voltage loads of the vehicle. The other half-wave rectified DC voltage may be employed to energize any opposite polarity DC voltage loads in the vehicle. Lastly, and most significantly, the higher-magnitude full-wave rectified DC voltage may be employed to energize a higher DC voltage load in the vehicle such as a window glass heater element.

The invention also contemplates, as an additional feature if desired, the use of a diode in the connection of the neutral node of the generator to ground where the diode is poled in a sense to prevent any inadvertent discharge of the vehicle battery to ground through the higher DC voltage load.

An important advantage of the invention is that it does not materially add to the cost or complexity of the usual automotive vehicle electrical system which typically includes a three-phase AC generator and a three-phase full-wave rectifier.

The foregoing and other aspects and features of the invention may be better understood by reference to the following detailed description of the drawing in which.

Figure 1:
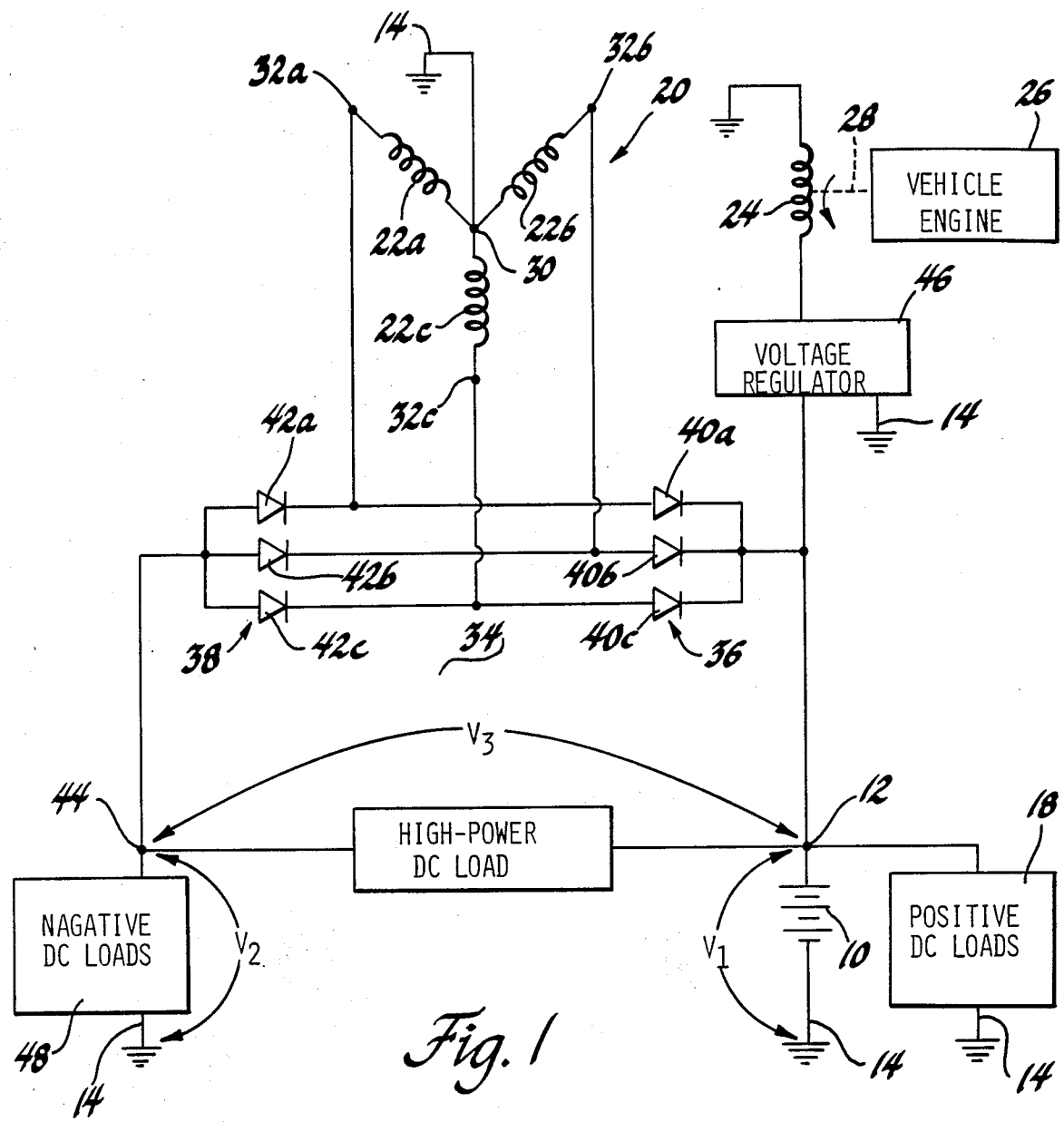
FIG. 1 is a combined block diagram and schematic diagram illustrating one embodiment of the invention.

Referring to FIG. 1 of the drawing, a motor vehicle electrical system includes a storage battery 10 connected between a main power terminal 12 and system ground 14 for providing standby power at a DC voltage of predetermined polarity and magnitude with respect to ground 14, e.g., nominally a positive polarity voltage having a magnitude of approximately fourteen volts.

Also connected between the main power terminal 12 and ground 14, as represented by block 18, are various positive polarity DC voltage loads of the type normally found in a vehicle. It will be understood that each of the loads 18 may include appropriate switches and like devices for controlling the application of the positive DC voltage to energize the load. One such control device may be a pair of switching contacts operated by the vehicle ignition key.

The automotive vehicle electrical system shown in FIG. 1 also includes a three-phase AC generator 20 having output windings 22a, 22b and 22c and a field winding 24. Preferably, the generator 20 is of the type where the phase windings 22a, 22b and 22c are stationary and the field winding 24 is mechanically driven in rotation by the vehicle engine 26 through an appropriate drive linkage 28. In operation, a three-phase AC voltage is developed across the output windings 22a, 22b and 22c having an amplitude determined by the amount of current fed through the field winding 24 and having a frequency determined by the rotating speed of the field winding 24.

The phase windings 22a, 22b and 22c are arranged in a wye or star configuration in which each of the windings 22a, 22b and 22c is connected between a common neutral node or terminal 30 and a different associated one of a set of output terminals 32a, 32b and 32c, respectively. As will be appreciated by those skilled in the art, the line-to-line phase voltage components of the three-phase AC voltage produced by the generator 20 appear between the respective output terminals 32a, 32b and 32c.

In accordance with an important principle of the invention, the neutral node or terminal 30 of the wye-connected generator output windings 22a, 22b and 22c is connected to system ground 14. As a consequence, due to the symmetry of the generator 20 in respect to the potential at the neutral node 30, the amplitude of the line-to-line phase voltage components of the three-phase AC voltage produced by the generator 20 alternately varies or swings between a positive potential maxima or peak residing above ground potential and a negative maxima or peak residing below ground potential, i.e., the amplitude of the AC voltage tends to cycle symmetrically with respect to the ground potential existent at the neutral node 30.

The motor vehicle electrical system shown in FIG. 1 further includes a three-phase full-wave bridge rectifier 34 which, for purposes of illustrating the principles of the invention, may be divided into first and second three-phase half-wave rectifiers 36 and 38. The first three-phase half-wave rectifier 36 includes diodes 40a, 40b and 40c each connected in a positive polarity sense between a different associated one of the generator output terminals 32a, 32b and 32c, respectively, and the main power terminal 12. The second three-phase half-wave rectifier 38 includes diodes 42a, 42b and 42c each connected in a negative polarity sense between a different associated one of the generator output terminals 32a, 32b and 32c and an auxiliary power terminal 44.

The first three-phase half-wave rectifier 36, provided by the diodes 40a, 40b and 40c, is effective to receive and rectify the three-phase AC voltage put out by the generator 20 to provide a three-phase half-wave rectified DC voltage $V_1$ of positive polarity between the main power terminal 12 and system ground 14. This first or positive polarity DC voltage $V_1$ provided by the invention may be utilized to charge the vehicle battery 10 and to energize the other positive polarity DC voltage loads 18 in the vehicle.

A voltage regulator 46 is responsive to the magnitude of the half-wave rectified positive DC voltage put out by the first half-wave rectifier 36 between the main power terminal 12 and ground 14 to control the amount of current fed through the field winding 24 of the generator 20 so that the three-phase AC voltage developed by the generator 20 has the correct amplitude to yield a half-wave rectified positive DC voltage $V_1$ of the desired magnitude (e.g., nominally fourteen volts) after rectification by the first half-wave rectifier 36. As an example, the voltage regulator 46 may be of the type shown in U.S. Pat. No. 3,098,964 or in U.S. patent application Ser. No. 775,172.

The second three-phase half-wave rectifier 38, provided by the diodes 42a, 42b and 42c, is effective to receive and rectify the three-phase AC voltage put out by the generator 20 to provide a three-phase half-wave rectified DC voltage $V_2$ of negative polarity between the auxiliary power terminal 44 and system ground 14. This second or negative polarity DC voltage $V_2$ provided by the invention may be utilized to energize any negative polarity DC voltage loads in the vehicle, as collectively represented by block 48 connected between the auxiliary power terminal 44 and ground 14. Depending upon the loading of the generator 20, the magnitude of the half-wave rectified negative DC voltage $V_2$ may approximate the magnitude of the regulated half-wave rectified positive DC voltage $V_1$.

As previously described, the first and second three-phase half-wave rectifiers 36 and 38 form in combination a three-phase full-wave rectifier 34 having a set of AC input terminals connected to the generator output terminals 32a, 32b and 32c, respectively, and having a pair of DC output terminals connected to the main and auxiliary power terminals 12 and 44, respectively. As a result, the three-phase full-wave rectifier 34 is effective to rectify the three-phase AC voltage put out by the generator 20 to develop a three-phase full-wave rectified DC voltage $V_3$ between the main power terminal 12 and the auxiliary power terminal 44. This third or full-wave rectified DC voltage $V_3$ provided by the invention is equal to the sum of the first and second half-wave rectified DC voltages $V_1$ and $V_2$.

Figure 2:
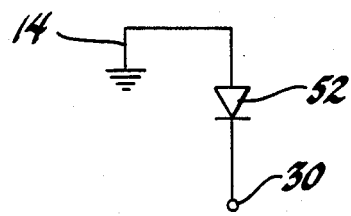
FIG. 2 is a schematic diagram partially illustrating an alternate embodiment of the invention.

Since the full-wave rectified DC voltage $V_3$ is of greater magnitude then either of its two component half-wave rectified DC voltages $V_1$ and $V_2$, the higher-magnitude DC voltage $V_3$ may be advantageously utilized to energize a high-power DC voltage load, such as that represented by block 50 connected between the main and auxiliary power terminals 12 and 44. As an example, the high-power vehicle load 50 may be a window glass heater element for either the windshield or backlight of the vehicle.

Where the high-power DC voltage load 50 does not include any control device to prevent energization of the load 50 by the battery 10 when the generator 20 is not operative, it is possible that the battery 10 may become undesirably discharged through the load 50, the second half-wave rectifier 34, and the phase windings 32a, 32b and 33c to ground 14. To preclude this occurrence, the invention contemplates an alternative embodiment, as shown in FIG. 2, in which a diode 52 is connected in a negative polarity sense between the neutral node 30 of the generator 20 and system ground 14 to block the discharge of the battery 10. Of course, where the diode 52 is employed, the potential at the neutral node 30 of the generator 20 will be one diode voltage drop above system ground 14.

It is to be noted that the foregoing embodiments of the invention are disclosed for purposes of illustration only and are not intended to limit the invention in any way. As will be appreciated by those skilled in the art, various alterations and modifications to the illustrated embodiments may be made without departing from the spirit and scope of the invention.

The embodiments of the invention in which an exclusive property or privilege is claimed are defined as follows:

1. A multiple DC voltage electrical system for an automotive vehicle, comprising:
    a three-phase AC generator driven by the engine of the vehicle for producing a three-phase AC voltage across three-phase output windings connected in a wye configuration having a neutral node;
    connection means for connecting the neutral node of the wye configured three-phase output windings of the generator to system ground such that the amplitude of the three-phase AC voltage alternately swings between positive and negative polarity in respect to system ground;
    an ungrounded three-phase full-wave rectifier having a set of input terminals connected with the three-phase output windings of the generator for receiving and rectifying the three-phase AC voltage to develop three distinct DC voltages in respect to a pair of output terminals, the three DC voltages including a first half-wave rectified DC voltage of positive polarity between one output terminal and system ground capable of supplying negative polarity DC voltage loads in the vehicle, a second half-wave rectified DC voltage of negative polarity between the other output terminal and system ground capable of supplying negative polarity DC voltage loads in the vehicle, and a third full-wave rectified DC voltage between the two output terminals equal to the sum of the first and second half-wave rectified DC voltages capable of supplying a high-power DC voltage load in the vehicle; and
    a storage battery connected between one of the output terminals of the rectifier and system ground for charging from the corresponding one of the positive and negative DC voltages put out by the rectifier and for supplying standby power at the corresponding one of the positive and negative DC voltages;
    the connection means including a diode poled so as to prevent discharge of the battery to system ground through the high-power DC voltage load when the generator is not operative.

2. In a motor vehicle, an electrical system comprising:
    a storage battery connected between a main power terminal and vehicle ground for providing standby power at a DC voltage of predetermined polarity and predetermined magnitude;
    various DC voltage loads connected between the main power terminal and vehicle ground for energization by the DC voltage appearing therebetween;
    a three-phase AC generator including three-phase output windings connected in a wye configuration having a neutral node and also including a field winding, the generator being driven by the motor of the vehicle to produce across the output windings a three-phase AC voltage having an amplitude determined by the amount of current fed through the field winding;

ground connection means for connecting the neutral node of the generator output windings to vehicle ground such that the amplitude of the three-phase AC voltage varies between the predetermined polarity and an opposite polarity with respect to vehicle ground;

a first three-phase half-wave rectifier connected between the output windings of the generator and the main power terminal, such first rectifier being poled in a sense to receive the three-phase AC voltage and rectify the same to produce a half-wave rectified DC voltage of the predetermined polarity between the main power terminal and vehicle ground;

a voltage regulator responsive to the half-wave rectified DC voltage of predetermined polarity appearing between the main power terminal and vehicle ground to control the amount of current fed through the field winding of the generator to establish and maintain such half-wave rectified DC voltage at the predetermined magnitude; and a second three-phase half-wave rectifier connected between the output windings of the generator and an auxiliary power terminal, such second rectifier being poled in a sense to receive the three-phase AC voltage and rectify the same to produce a half-wave rectified DC voltage of the opposite polarity between the auxiliary power terminal and vehicle ground;

the first and second three-phase half-wave rectifiers forming in combination a three-phase full-wave rectifier effective to produce a full-wave rectified DC voltage between the main power terminal and the auxiliary power terminal equal to the sum of the two half-wave rectified DC voltages for energizing a high-power DC voltage load in the vehicle such as a window glass heater element;

the connection means including a diode poled so as to prevent discharge of the battery to system ground through the high-power DC voltage load when the generator is not operative.

* * * * *